Sept. 5, 1950  R. K. DAY  2,521,048
METHOD OF FABRICATING GLAZING UNITS
Filed Jan. 4, 1945

Inventor
RALPH K. DAY.
By Frank Fraser
Attorney

Patented Sept. 5, 1950

2,521,048

UNITED STATES PATENT OFFICE 2,521,048

METHOD OF FABRICATING GLAZING UNITS

Ralph K. Day, Toledo, Ohio, assignor to Libbey-Owens-Ford Glass Company, Toledo, Ohio, a corporation of Ohio Application January 4, 1945, Serial No. 571,323

3 Claims. (Cl. 49—82)

The present invention relates to the method of fabricating an all glass glazing unit.

More particularly, the glazing unit is fabricated from sheets of plate or window glass which are joined together into an integral unit by means of glass spacing strips fused between the glass sheets entirely around their marginal portions to create a hermetically sealed dead air space within the unit.

It is an important feature of the present invention to employ, during the fusing of the glass face elements and edge separator strips, a flame produced from gas substantially free of constituents which result in the formation of water during combustion or from condensable products of combustion. When ordinary natural or artificial illuminating gas is used, drops of water form in the vicinity of the joint, and if trapped within the unit creates a decidedly objectionable condition. The air left within the unit should be clean and dry, that is, sufficiently free of moisture that condensation will not occur within the interior of the unit when it is subjected to the varying temperatures encountered in use.

In accordance with the present invention, I employ substantially pure carbon monoxide to produce the flame for the fusing operations because its products of combustion are not condensable. When selecting the carbon monoxide to be used, it is not required that it be absolutely pure in a chemical sense but rather that it be sufficiently free of hydrogen and hydrocarbons to avoid the formation of excessive moisture or condensable products during combustion.

A further important feature resides in the preferred use of wedge-shaped separator glass pieces to be fused between the glass face elements, with the base of the wedge being to the inside so that the sealing flame is permitted to work from the inside toward the outside, thus insuring a properly fused joint to give a hermetically sealed glazing unit.

Other objects and advantages of the invention will become more apparent during the course of the following description when taken in connection with the accompanying drawings.

In the drawings wherein like numerals are employed to designate like parts throughout the same:

Figure 3:
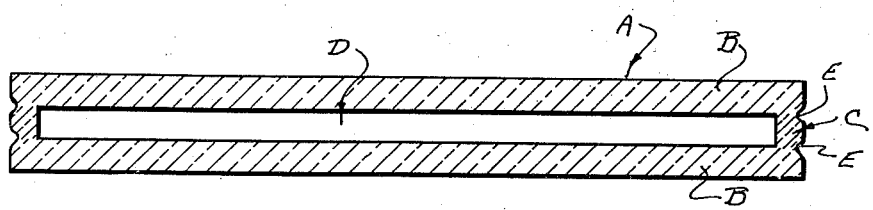
Fig. 3 is a transverse section through a completed unit.

Referring to Fig. 3, the glazing unit A comprises the parallel face elements B which may be ordinary plate or window glass or special glasses such as tinted glass, etc. Fused between and to the marginal portions of the face elements B is the glass separator C which creates the hermetically sealed air space D.

Glazing units of this type are desirable for use in many installations such as in buildings and vehicles. They are effective against loss of heat or transfer of heat and also prevent condensation when mounted in openings exposed to temperature and humidity differentials on both sides thereof.

Figure 1:
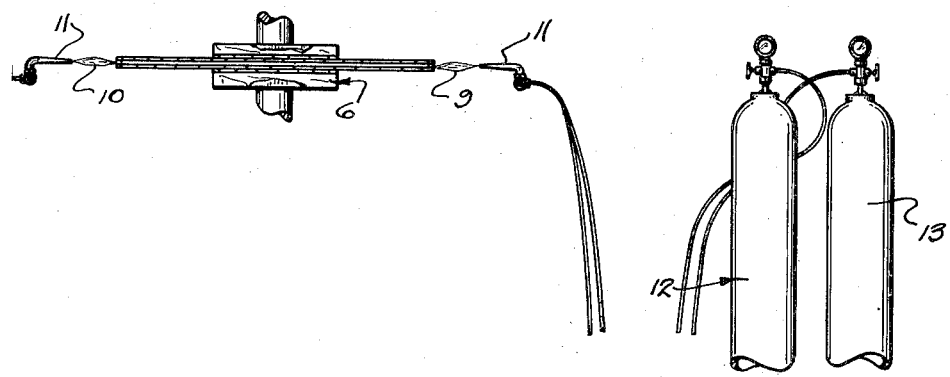
Fig. 1 is a diagrammatic representation of apparatus which may be used in carrying out the method.
Figure 2:
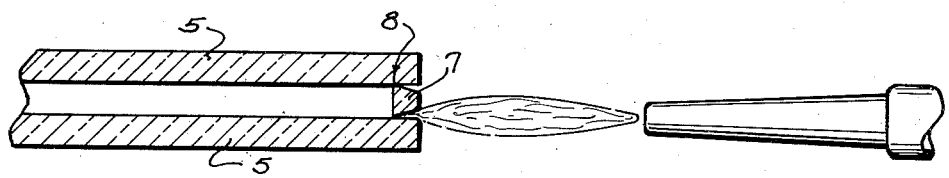
Fig. 2 is a fragmentary sectional view showing the glass separator strips in position between the glass face elements at the beginning of the sealing or fusing operation.

To fabricate the unit A, the glass plates 5 in Fig. 2 are mounted in a holding device 6 (Fig. 1), with the spacer elements 7 properly positioned as shown. Preferably, the spacer elements 7 are tapered, and when placed between the glass the base of the wedge is inwardly of the unit whereby to give substantially line contact as at 8 between the glass surfaces and the separator itself. In the case of a rectangular glazing unit, four such strips would be used—one along each edge and fitted at the corners to give a continuous separator completely around the entire unit. Obviously, any suitable number and shape of separator pieces may be used to give the necessary continuity, and joints between adjacent sections are fused together during fabrication.

When ordinary gas is used in the welding operation, drops of water form so that if some of the products of combustion are trapped in the space D of the unit, the contained moisture produces an unsatisfactory condition. This is because ordinary fuel gas is a hydrocarbon, and when combining with oxygen of the air during combustion, hydrogen unites with oxygen to form water. For example, methane, which is the principal constituent of natural gas, has a formula of $CH_4$ and combines with $O_2$ to form $CO_2$ plus $H_2O$ as the products of combustion. Common gaseous fuels are hydrocarbons, and thus during burning release hydrogen to unite with the oxygen in the air to form water. Some gaseous fuels, such as producer gas, contain carbon monoxide which is not a hydrocarbon, but this is mixed with other components which are hydrocarbons, and this explains why the products of combustion of such fuels contain substantial moisture.

When fabricating all glass units in accordance with my process, the gas flame employed for the fusing operation is produced from substantially pure carbon monoxide gas and pure air or oxygen. This will give optimum results. However, when satisfactory carbon monoxide gas is used as the fuel, air, which does not contain excessive moisture, from the average room may be used instead of pure air or oxygen. The controlling factor is that the flame is produced from constituents and under conditions which will not produce excessive moisture or condensable products of combustion.

A desirable condition is one wherein a fuel burned with an air or oxygen containing material whose products of combustion have a dew point, at 0° C., that is less than 4.5 millimeters of mercury.

In carrying out the fabricating technique, it is preferred that the assembled glass and separator members be properly associated with one another in a suitable holding jig or clamp. It is considered beneficial as well as desirable from a production standpoint to seal all of the edges simultaneously, and in Fig. 1 two edges of a single unit are being fused by the flames 9 and 10 working along opposite edges. The burners or nozzles 11 are supplied with carbon monoxide from the tank 12 and oxygen from the tank 13. The use of this equipment will be readily understood by those versed in the art. Any number of burners can be used and when producing a large number of units of the same size, a production line setup can be established with one or more burners operating along each edge or side of the unit. Circular or other shaped units can be produced as well as rectangular.

As stated, the separator strips in their original form are preferably wedge-shaped so that the flame can work from the inside toward the outside edge, giving a satisfactory and adequately fused joint between the elements. With the type of separator illustrated in Fig. 2, the general edge effect of Fig. 3 will result, that is, slight grooves E will be created as a result of using the tapered separators. These grooves are in no way objectionable so long as the separators and glass face elements are entirely fused together, which can easily be done when using the type of fuel recommended and when shaping the separator strips in such a way that the innermost portions of the separator will be fused to the faces.

Any products of combustion entering the space D during the sealing operation will not be objectionable when employing substantially pure carbon monoxide as the fuel when burned under the conditions prescribed. Practically, it is next to impossible to weld the pieces together without some of the products of combustion entering the air space and being permanently trapped therein. When using my fuel, this is not a disadvantage because no condensable substance is introduced and to this extent it is beneficial in replacing part of the air in the space.

Fabrication of the units should be accomplished in a controlled atmosphere to insure that the moisture content of the air sealed into the unit will be sufficiently low there will be no condensation within the same when subjected to conditions of use.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of fabricating an all glass unit having a dehydrated dead air space, comprising arranging the glass elements of which the unit is composed in proper assembled relationship, and then fusing them together with a flame produced from substantially pure carbon monoxide gas and a source of oxygen that is substantially free of hydrogen and hydrogen-containing compounds.

2. The method of fabricating an all glass glazing unit having a dead air space, comprising arranging wedge-shaped glass pieces between and completely around the marginal portions of two plates of glass with the base portion of said separator strips being placed innermost of the assembly thus formed, and then fusing the glass plates and separator strips together with a flame produced from carbon monoxide gas free of constituents which form water during combustion.

3. The method of fabricating an all glass glazing unit having a dehydrated dead air space, comprising arranging the glass elements of which the unit is composed in proper assembled relationship, and then fusing them together with a flame produced from carbon monoxide substantially free from hydrogen and hydrocarbons.

RALPH K. DAY.

REFERENCES CITED

The following references are of record in the file of this patent:

UNITED STATES PATENTS

| Number | Name | Date |
| --- | --- | --- |
| 1,261,939 | Johanson | Apr. 9, 1918 |
| 2,193,393 | Danner | Mar. 12, 1940 |
| 2,198,578 | Hazelton | Apr. 23, 1940 |
| 2,297,337 | Wiley | Sept. 29, 1942 |
| 2,347,614 | Rudolph | Apr. 25, 1944 |